US010567360B2

(12) United States Patent
Nirwal et al.

(10) Patent No.: US 10,567,360 B2
(45) Date of Patent: Feb. 18, 2020

(54) SSH KEY VALIDATION IN A HYPER-CONVERGED COMPUTING ENVIRONMENT

(71) Applicant: VMWARE, INC., Palo Alto, CA (US)

(72) Inventors: Vishesh Kumar Nirwal, Bangalore (IN); Suket Gakhar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 226 days.

(21) Appl. No.: 15/687,561

(22) Filed: Aug. 28, 2017

(65) Prior Publication Data

US 2019/0007382 A1 Jan. 3, 2019

(30) Foreign Application Priority Data

Jun. 29, 2017 (IN) .............................. 201741022857

(51) Int. Cl.
| | |
|---|---|
| H04L 29/06 | (2006.01) |
| G06F 9/455 | (2018.01) |
| G06F 9/54 | (2006.01) |
| H04L 9/32 | (2006.01) |

(52) U.S. Cl.
CPC ........ H04L 63/061 (2013.01); G06F 9/45558 (2013.01); G06F 9/54 (2013.01); H04L 63/0281 (2013.01); H04L 63/0435 (2013.01); H04L 63/0442 (2013.01); H04L 63/08 (2013.01); H04L 63/0884 (2013.01); G06F 2009/45595 (2013.01); H04L 9/3247 (2013.01); H04L 63/166 (2013.01)

(58) Field of Classification Search
None
See application file for complete search history.

(56) References Cited

U.S. PATENT DOCUMENTS

| | | | | |
|---|---|---|---|---|
| 8,176,336 | B1 * | 5/2012 | Mao ........................ | H04L 9/006 713/189 |
| 8,214,884 | B2 * | 7/2012 | Xia ..................... | H04L 63/0281 709/217 |
| 8,868,913 | B1 * | 10/2014 | Watsen ................... | H04L 41/28 713/175 |
| 8,909,939 | B1 * | 12/2014 | Beda, III .............. | G06F 21/606 713/189 |
| 8,977,842 | B1 * | 3/2015 | McCorkendale ....... | G06F 21/53 380/285 |

(Continued)

OTHER PUBLICATIONS

Bugiel et al.; AmazonIA: When Elasticity Snaps Back; 2011; Retrieved from the Internet <URL: https://dl.acm.org/citation.cfm?id=2046753>; pp. 1-12, as printed. (Year: 2011).*

(Continued)

*Primary Examiner* — Saleh Najjar
*Assistant Examiner* — Michael W Chao
(74) *Attorney, Agent, or Firm* — Thomas | Horstemeyer, LLP

(57) ABSTRACT

Disclosed are various examples for validating a public SSH host key. The examples can be implemented in a hyper-converged computing environment to detect potential man-in-the-middle attacks in which an attacker intercepts or spoofs an internet protocol (IP) address of a target virtual machine (VM) that is being addressed by a management service and with which a secure shell (SSH) session is being established.

20 Claims, 6 Drawing Sheets

(56) References Cited

U.S. PATENT DOCUMENTS

| | | | | |
|---|---|---|---|---|
| 9,692,757 | B1* | 6/2017 | Mikulski | H04L 63/0876 |
| 2007/0064935 | A1* | 3/2007 | Ben-Yehuda | H04L 63/06 |
| | | | | 380/44 |
| 2007/0083665 | A1* | 4/2007 | Miao | H04L 41/0213 |
| | | | | 709/230 |
| 2009/0106551 | A1* | 4/2009 | Boren | H04L 9/0822 |
| | | | | 713/158 |
| 2010/0082991 | A1* | 4/2010 | Baldwin | H04L 9/083 |
| | | | | 713/176 |
| 2012/0054486 | A1* | 3/2012 | Lakkavalli | G06F 21/57 |
| | | | | 713/156 |
| 2012/0054843 | A1* | 3/2012 | Horman | G06F 21/31 |
| | | | | 726/7 |
| 2013/0117554 | A1* | 5/2013 | Ylonen | H04L 9/08 |
| | | | | 713/151 |
| 2013/0160013 | A1* | 6/2013 | Pires | G06F 21/41 |
| | | | | 718/1 |
| 2013/0191631 | A1* | 7/2013 | Ylonen | H04L 63/1483 |
| | | | | 713/153 |
| 2013/0298210 | A1* | 11/2013 | Wright | H04L 63/0823 |
| | | | | 726/7 |
| 2015/0040125 | A1* | 2/2015 | Anderson | G06F 9/45533 |
| | | | | 718/1 |
| 2015/0222604 | A1* | 8/2015 | Ylonen | H04L 63/062 |
| | | | | 713/171 |
| 2015/0256341 | A1* | 9/2015 | Ye | H04L 41/0803 |
| | | | | 713/164 |
| 2016/0134423 | A1* | 5/2016 | Harjula | H04L 9/3247 |
| | | | | 713/176 |
| 2017/0026355 | A1* | 1/2017 | Mathaiyan | H04L 63/08 |
| 2017/0171164 | A1* | 6/2017 | Alexander | H04L 63/0823 |
| 2017/0220368 | A1* | 8/2017 | Tse | G06F 9/45558 |
| 2018/0145955 | A1* | 5/2018 | Nirwal | H04L 9/0894 |
| 2018/0262388 | A1* | 9/2018 | Johnson | G06F 9/448 |
| 2018/0351926 | A1* | 12/2018 | Negahdar | H04L 63/062 |
| 2019/0007382 | A1* | 1/2019 | Nirwal | H04L 63/061 |

OTHER PUBLICATIONS

Ali et al.; Flexible and Scalable Public Key Security for SSH; 2004; Retrieved from the Internet <URL: http://www.ists.dartmouth.edu/library/87.pdf>; pp. 1-14, as printed. (Year: 2004).*

No stated author; Getting Console Output and Rebooting Instances; 2016; Retrieved from the Internet <URL: https://web.archive.org/web/20160319010839/https://docs.aws.amazon.com/AWSEC2/latest/UserGuide/instance-console.html>; pp. 1-3, as printed. (Year: 2016).*

No stated author; AWS Systems Manager for Microsoft System Center VMM; 2017; Retrieved from the Internet <URL: https://web.archive.org/web/20170502232351/http://docs.aws.amazon.com/AWSEC2/latest/WindowsGuide/scvmm.html>; pp. 1-2, as printed. (Year: 2017).*

* cited by examiner

SSH KEY VALIDATION IN A HYPER-CONVERGED COMPUTING ENVIRONMENT

RELATED APPLICATIONS

Benefit is claimed under 35 U.S.C. 119(a)-(d) to Foreign Application Serial No. 201741022857 filed in India entitled "SSH KEY VALIDATION IN A HYPER-CONVERGED COMPUTING ENVIRONMENT", on Jun. 29, 2017, by VMware, Inc., which is herein incorporated in its entirety by reference for all purposes.

BACKGROUND

Hyper-converged infrastructure (HCI) is a type of virtual computing platform that converges compute, networking, virtualization, and storage into a single software-defined architecture. For instance, a single software application can interact with each component of hardware and software as well as an underlying operating system. Hyper-converged infrastructures provide enterprises and other organizations with modular and expandable compute, storage, and network resources as well as system backup and recovery. In a hyper-converged infrastructure, compute, storage, and network resources are brought together using preconfigured and integrated hardware.

A management application can manage another physical or virtual machine through a network-based communication protocol. One example of such a protocol is secure shell (SSH), which is a protocol that can employ public-private key technology to secure communications between two SSH clients within an SSH session. A risk exists for man in the middle attack where an attacker can intercept communications during the initialization or key exchange phase of an SSH session.

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
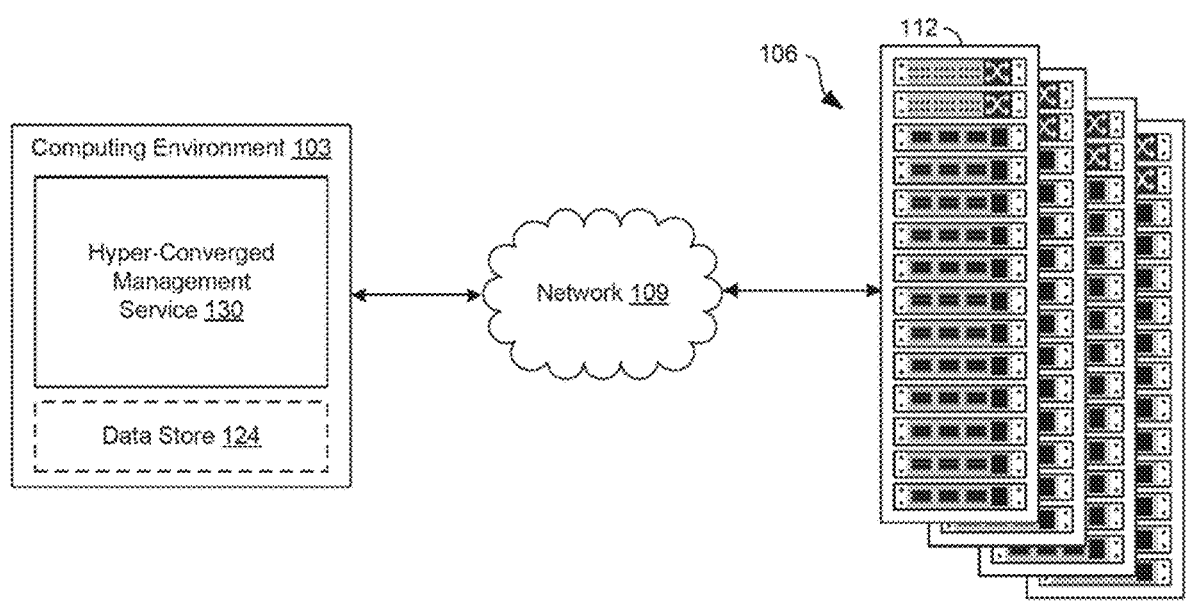
FIG. 1 is a drawing of an example of a hyper-converged computing environment.

The present disclosure relates to device replacement in hyper-converged infrastructure computing environments. Hyper-converged computing environments can include many computing devices or servers, which are also referred to as "nodes" or "hosts," which can be in communication over network connections. Over time, hyper-converged infrastructure services can facilitate various configurations of a server, such as executing multiple virtual machines within a given physical server. In some implementations of a hyper-converged environment, one or more physical servers or computing devices are installed in a rack and connected to a rack switch to facilitate communication between the servers. The rack switch can also be connected to a network that allows the servers to communicate with other servers that are installed in other racks.

In some implementations of a hyper-converged infrastructure, a particular enterprise may be allocated more than one rack of servers. The servers in these racks might communicate with one another using an externally addressable or accessible internet protocol (1P) address or domain name. For example, a server in rack A might communicate with a server in rack B using an externally accessible IP address. In this example, the IP address might be inaccessible by machines from outside of a data center or outside of a firewalled network but externally accessible by other servers that are within the network or within the data center.

Additionally, an application or service that is tasked with management of the servers or virtual machines associated with the enterprise might be executed in one server and perform management tasks on virtual machines that are executed on different physical servers that might be located in a different rack. One way in which various management tasks can be performed is through a secure communication session that is established between a management service and an application that is executed locally on the other physical server.

One example of a secure communication session through which management tasks can be performed by a management service is secure shell, or SSH. To establish a SSH session between two devices, a key exchange might be performed between the management service, which is a connecting client in this scenario, and the SSH host, which is the application or virtual executed on the physical server that is being managed by the management service. In one example, a public host key is provided to the connecting client by the machine with which a SSH session is being requested. A client connecting to the machine providing the public SSH host key can encrypt data sent to the machine using the public host key as a part of the process to establish a SSH transport layer associated with the SSH session. The key exchange can also involve the connecting client providing a public or symmetric key to the SSH host for this purpose as well. Atop the transport layer, a user authentication layer can be established through which user authentication can occur. User authentication of the connecting client can be performed by a username/password combination, an authentication token, or some other user authentication mechanisms. In the context of this disclosure, a management service tasked with managing hyper-converged infrastructure can be the connecting client that is authenticated by an application or service running on another server, such as a virtual machine application or a management client running on the server.

The public SSH host key corresponds to a private key associated with the SSH host that is used to established the SSH transport layer. In the above scenario, the connecting client can store the public SSH host key of the SSH host in a host file. The host file can contain the public key or a key signature of the public key of SSH hosts to which the SSH client has previously connected.

Accordingly, in one scenario, a man-in-the-middle attack is a risk when the management service, or any SSH client, is initiating a SSH session with a SSH host to which it has not connected before or one whose host key stored by the connecting client has expired or requires refreshing for any other reason. In one scenario, if a nefarious SSH host intercepts a SSH connection request at or before the key exchange, the nefarious host can provide its public SSH host key, which the SSH client might consider to be the legitimate. Additionally, the SSH client might continue constructing a SSH session with the nefarious host and provide other potentially compromising information to the SSH host, such as another credential.

Accordingly, examples of this disclosure provide a mechanism whereby a public SSH host key can be validated by a trusted service that is running on a host machine in which a target virtual machine (VM) is also running. The trusted service can validate the public SSH host key using one or more application programming interfaces (APIs) that allow the service to communicate with the target VM. In this way, the trusted service can validate the public SSH host key without communicating with the target VM.

With reference to FIG. 1, an example of a hyper-converged computing environment 100 is shown. The hyper-converged computing environment 100 can include a computing environment 103 and various computing systems 106a . . . 106b in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks. Ethernet networks, telephony networks, and other types of networks.

In various embodiments, the computing systems 106 can include a plurality of devices installed in racks within a data center or a server room. The devices in the computing systems 106 can include any number of physical servers. For example, a computing environment 103 can include an enterprise computing environment that includes hundreds or even thousands of physical machines that are positioned in racks 112 distributed geographically and connected to one another through the network 109. A virtual machine can be executed in a physical server within the racks 112. A physical server can also execute more than one virtual machine. The virtual machine can represent an emulation of a physical computing device that is executed within the host machine. A hypervisor can provide access to the physical resources of the machine in which the virtual machine is executed.

The devices in the racks 112 can include, for example, memory and storage devices, servers, central processing units (CPUs), graphics processing units (GPUs), switches, power supplies, and networking cables or other interconnects. The devices, such as servers, can have dimensions suitable for quick installation in slots within the racks. In various examples, the servers can include requisite physical hardware and software to create and manage a virtualization infrastructure. The physical hardware for a server can include a CPU, GPU, data bus, memory, and other components. The servers can include a pre-configured hyper-converged computing device where a hyper-converged computing device includes pre-tested, pre-configured, and pre-integrated storage, server and network components, including software, that are positioned in an enclosure installed in a slot on a rack.

Additionally, as noted above, each server in the hyper-converged computing environment 100 can execute a hypervisor. In some examples, a hypervisor can be installed on a server 115 to support a virtual machine execution space within which one or more virtual machines (VMs) can be instantiated and executed. In some examples, the hypervisor can include VMware ESX™ hypervisor or a VMware ESXi™ hypervisor. It is understood that the computing systems 106 are scalable, meaning that the computing systems 106 in the hyper-converged computing environment 100 can be scaled to include additional servers 115, switches 118, and other components.

Similarly, the computing environment 103 can include, for example, a server or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. Although shown separately from the computing systems 106, it is understood that the computing environment 103 can be implemented in the computing systems 106 within a rack.

The computing environment 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 over the network 109, sometimes remotely, the computing environment 103 can be described as a remote computing environment 103 in some examples.

The computing environment 103 can include a data store 124. The data store 124 can include memory of the computing environment 103, mass storage resources of the computing environment 103, or any other storage resources on which data can be stored by the computing environment 103. The data store 124 can include memory of the servers 115 in some examples. The data stored in the data store 124, for example, can be associated with the operation of the various services or functional entities described below.

The components executed on the computing environment 103 can include, for example, a hyper-converged management service 130 as well as other applications, services, processes, systems, engines, or functionality not discussed in detail herein. The hyper-converged management service 130 can oversee the operation of the hyper-converged computing environment 100 through management of the computing systems 106 as well as the devices and software that make up the computing systems 106. In some examples, an enterprise, organization, or other entity, can operate the hyper-converged management service 130 to oversee or manage the operation of devices in the racks 112, such as servers and switches.

Hyper-converged computing devices in the computing systems 106 can process various workloads. Workloads can include the amount of processing that the hyper-converged computing environment 100 has been instructed to process at a given time. The workloads can be associated with applications or virtual machines executing on the servers within the hyper-converged computing environment 100. For instance, the workloads can include tasks to be processed to provide employees of an enterprise with remote desktop sessions or other virtualized computing sessions. The hyper-converged management service 130 can maintain a listing of active or inactive workloads as well as oversee the assignment of various workloads to various devices in the computing systems 106. For instance, the hyper-converged management service 130 can assign a workload lacking in available resources to a server that has resources sufficient to handle the workload 133. The workloads 133 can be routed to various servers 115 by switches within the racks 112 as network traffic.

Workloads can also be implemented in one or more virtual machines (VMs) that are executed within the various servers in a rack 112. Execution of VMs can be configured and/or initiated by the hyper-converged management service 130 within the computing environment 103. VMs can be assigned to a particular enterprise's workloads by the hyper-converged management service 130, which can cause the VMs to be executed and assigned to particular tasks of a particular enterprise. In some examples, the hyper-converged management service 130 can execute VMs on behalf of multiple enterprises within a particular rack 112. In other examples, an hyper-converged management service 130 can be executed by or on behalf of a single enterprise and manage the various workloads that are supported by the servers and VMs that are executed within a particular rack.

Figure 2:
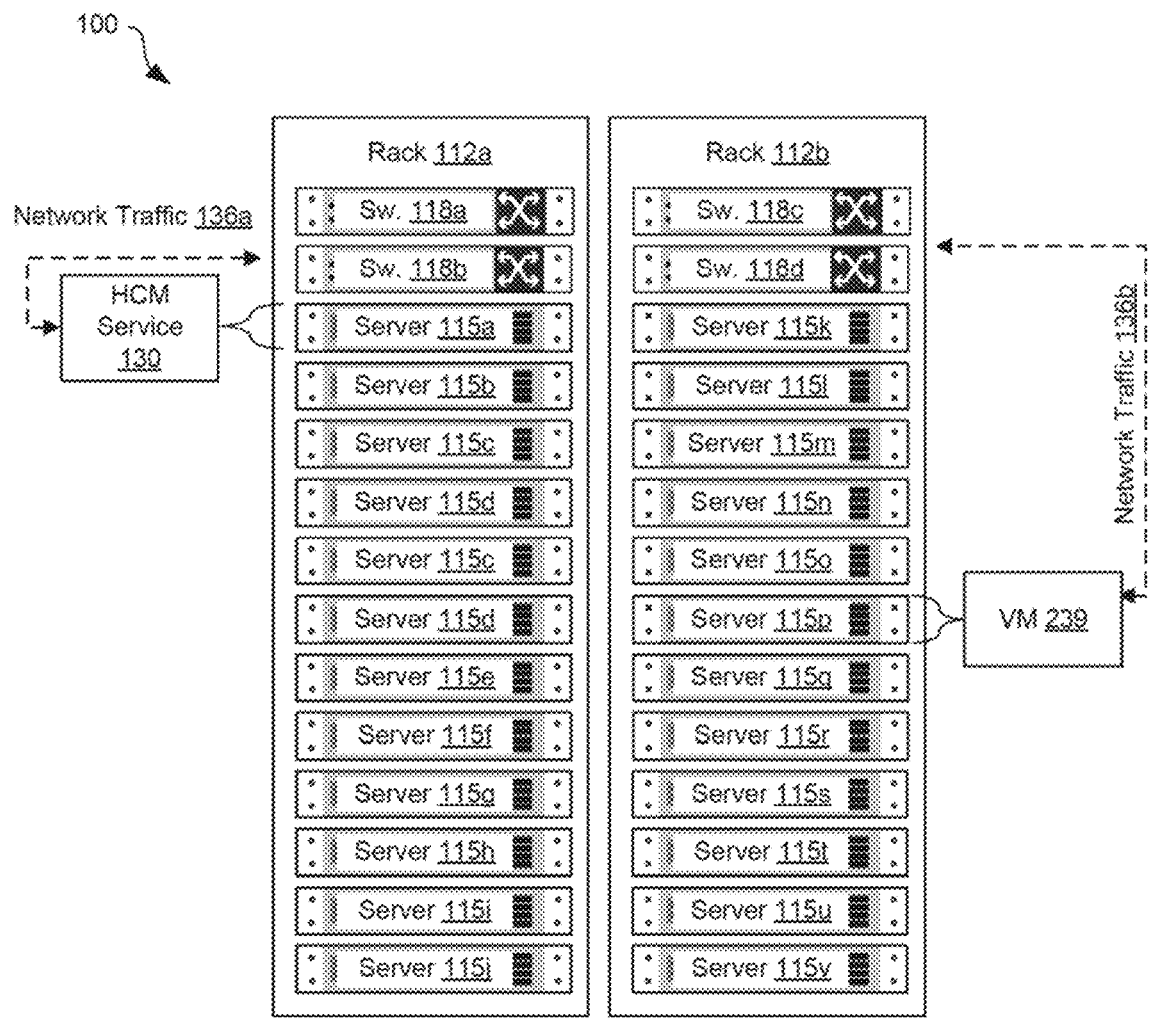
FIG. 2 is a drawing of another example of a hyper-converged computing environment.

Turning now to FIG. 2, another depiction of the hyper-converged computing environment 100 is shown. The hyper-converged computing environment 100 illustrates an example of how the hyper-converged management service 130 can be executed within a first server 115 within a rack and communicate with a VM 239 that is executed within a second server 115 in a different rack 112b in the hyper-converged computing environment 100. The Hyper-converged management service 130 can communicate with the VM 239 through one or more network switches 118 that are installed within the racks 112 or within a data center environment in which the racks 112 are located. In one example, the hyper-converged management service 130 can issue management commands to the VM 239 over a secure shell (SSH) connection or another form of secured communication session that requires encryption.

The Hyper-converged management service 130 can serve as an interface that manages the logical and physical infrastructure of a particular hyper-converged computing environment 100. The Hyper-converged management service 130 can cause new resources, such as computing, storage, or networking capacity, to be allocated within one or more racks 112 in a particular environment. The Hyper-converged management service 130 can also serve as an ongoing administrative interface for the hyper-converged computing environment 100 on behalf of an administrator. Through an administrative user interface, an administrator can create or allocate additional VMs 239, remove or relocate currently executing VMs 239, allocate additional computing resources to VMs 239, or perform other adjustments to any VMs 239 that the administrator has the authority to administer within the hyper-converged computing environment 100.

For example, the hyper-converged management service 130 can issue a command for a particular VM 239 in a particular rack 112 to execute an application, cease execution of an application, or perform other tasks. In many examples, the hyper-converged management service 130 can be implemented as an application or service that is executed within a VM 239 in a particular server 115 within a rack 112. To manage the virtual infrastructure comprising various VMs 239 across the racks 112, the hyper-converged management service 130 requires the ability to communicate with the VMs 239 in a secure manner, such as using SSH. Examples of this disclosure reduce the risk of a man-in-the-middle attack in which a nefarious machine or virtual machine can interfere with the key exchange process that is a part of the SSH initialization procedure. This can particularly be a risk when a particular VM 239 is accessible using a publicly accessible or addressable IP address. For example, if the hyper-converged management service 130 is executed in a first rack 112 and the target VM 239 that it is attempting to manage is in a second rack 112, the IP address of each might be an external IP address rather than an internal IP address. In this scenario, an attacker can "pose" as the VM 239 and spoof its IP address or potentially intercept communications sent to the VM 239 via the externally accessible IP address.

In the case of a SSH connection between the hyper-converged management service 130 and a VM 239, the process of initiating a SSH connection can require a key exchange between the hyper-converged management service 130 and the VM 239 or a SSH service or daemon running on the VM 239. After a key exchange process, a SSH transport layer can be constructed between the hyper-converged management service 130 and VM 239 so that network traffic 136a, 136b can be securely exchanged according to the SSH protocol. The key exchange phase of the initialization of a SSH connection might require the VM 239 and Hyper-converged management service 130 to exchange respective public SSH host keys that are saved or stored within the respective SSH host files and used to encrypt network traffic 136 that is sent between respective SSH implementations that are running on the respective machines.

When connecting to a VM 239 for the first time, the hyper-converged management service 130 does not possess the public SSH host key of the VM 239. Accordingly, a man-in-the-middle attack vector arises when an attacker can potentially spoof the IP address of the target VM 239 or intercept the network traffic 136 destined for the VM 239. The attacker can provide a fake or fraudulent public SSH host key to the hyper-converged management service 130, which may save the fraudulent key in its host file as the authoritative or the current copy of the public SSH host key of the target VM 239. Accordingly, as a result, the hyper-converged management service 130 may use the fraudulent key as the basis for setting up the SSH transport layer and the SSH connection between the hyper-converged management service 130 and the attacker. If the hyper-converged management service 130 considers the attacker to be the VM 239, the hyper-converged management service 130 might subsequently supply the attacker with the sensitive information, such as the root credentials of a workload domain VM, a user credential, security certificate, or other sensitive data to the attacker.

Figure 3:
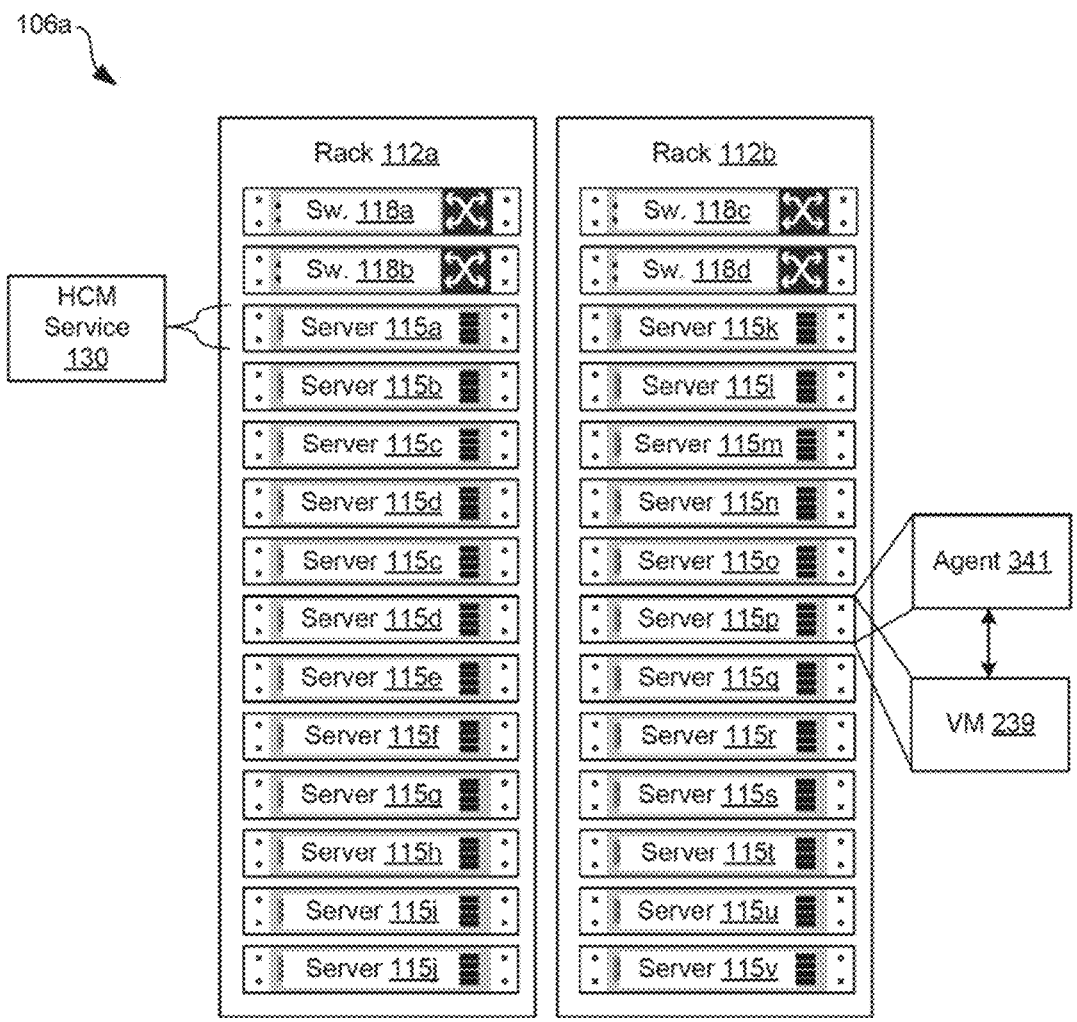
FIG. 3 is a drawing of another example of a hyper-converged computing environment.

Accordingly, examples of this disclosure can provide a mechanism in which the public SSH host key of a VM 239 can be validated before the hyper-converged management service 130 establishes a SSH connection with the VM 239. Reference is now made to FIG. 3, which illustrates how the public SSH host key of a VM 239 can be validated by an agent 341 that is running on the server 115 on which the VM 239 is also running. The agent 341 can communicate with the VM 239 using an application programming interface (API) or an inter-process communication protocol that allows the agent 341 to validate the public SSH host key of the VM 239 without communicating with the VM 239 using the same IP address that the hyper-converged management service 130 used to contact the VM 239.

Accordingly, the hyper-converged management service 130, upon obtaining a public SSH host key from the VM 239 (or an attacker attempting a man-in-the-middle attack), can validate the validity of the key by contacting the agent 341, which can be accessible using a different IP address than the VM 239. The agent 341 can provide a validity indication regarding the public SSH host key to the hyper-converged management service 130, which indicates whether the key is valid. If the key is valid, the hyper-converged management service 130 can save the public SSH host key in its host file and/or continue setting up the SSH connection between the hyper-converged management service 130 and the VM 239. If the validity indication indicates that the public SSH host key is not valid, the hyper-converged management service 130 can cease setting up the SSH connection or perform other security exception logic or error handling.

The validity indication can indicate whether the public SSH host key provided by the hyper-converged management service 130 to the agent 341 is valid in response to the hyper-converged management service 130 providing a copy of the public SSH host key or an artifact of the key. An artifact of the public SSH host key can include a signature or hash generated from the public SSH host key.

If the validity indication indicates that the public SSH host key is valid, the hyper-converged management service 130 can store the public SSH host key in the data store 124 or other device storage in which the SSH host file can be maintained. The public SSH host key can be associated with an expiry window or expiry date. Upon expiration, the hyper-converged management service 130 can request an updated public SSH host key from a particular VM 239, which can be validated once again by requesting a validity indication from the agent 241.

Figure 4:
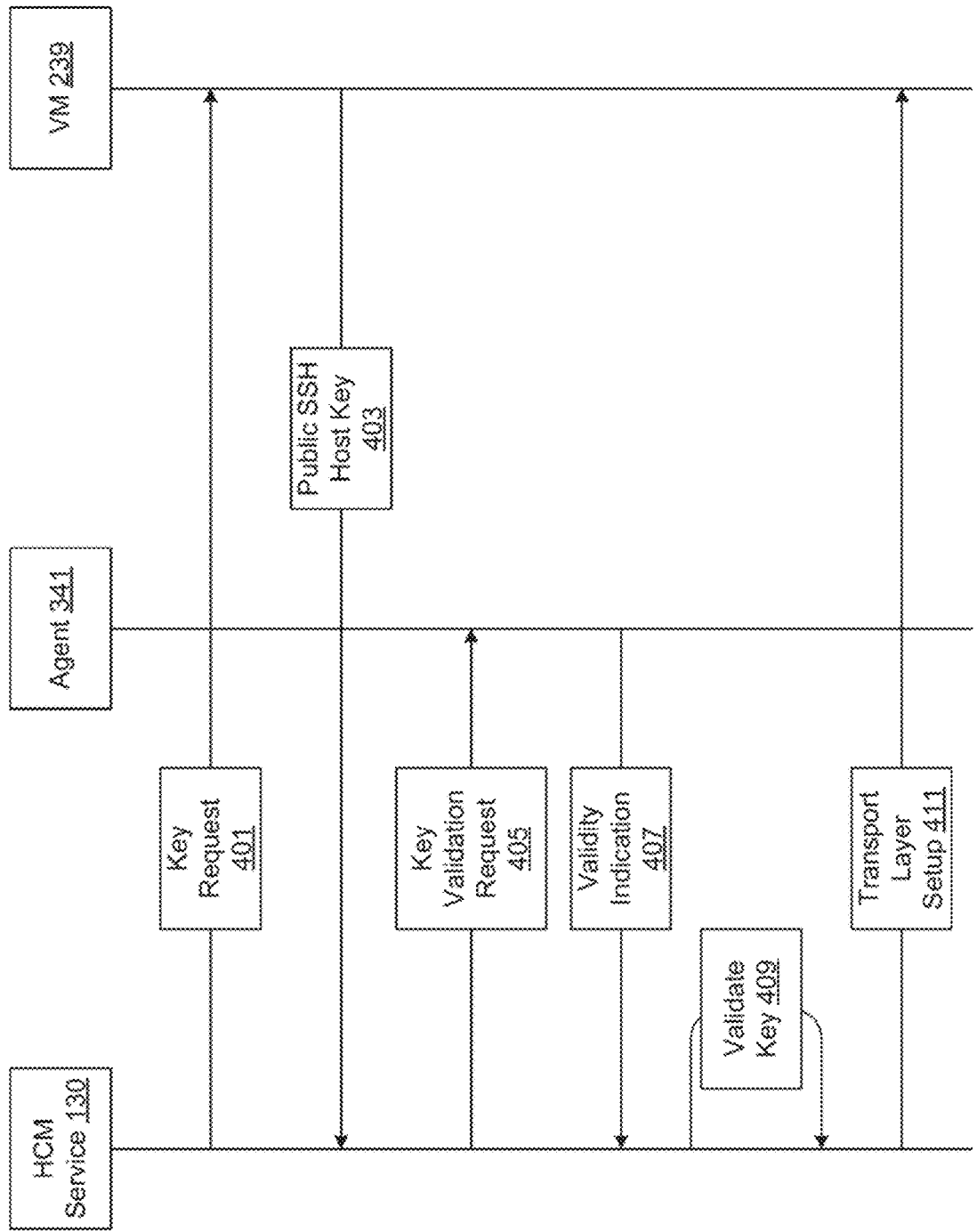
FIG. 4 is a sequence diagram showing interactions between components according to one example of the disclosure.

Referring next to FIG. 4, shown is a sequence diagram that illustrates how the hyper-converged management service 130 can validate a public SSH host key obtained from a VM 239 that is managed by the hyper-converged management service 130. First, at step 401, the hyper-converged management service 130 can transmit a key request 401 to the VM 239. The key request 401 can represent a phase of the SSH key exchange or initialization process that is performed by SSH implementations or daemons running on the VM 239 and a machine that is executing the hyper-converged management service 130.

In response to the key request 401, the VM 239 or a SSH daemon of service running on the VM 239 can respond with a public SSH host key 403. As noted above, the public SSH host key 403 of the VM 239 is used by SSH implementations to secure communications between the hyper-converged management service 130 and the VM 239. The VM 239 can maintain a corresponding private key. In many implementations, the hyper-converged management service 130 may also provide a public SSH host key corresponding to the VM 239 and also maintain a respective private key. Accordingly, in some implementations, the hyper-converged management service 130 can also provide its public SSH host key to the VM 239, a step which is not shown in FIG. 4 for ease of depiction and because it is not necessary for a full understanding of implementations of the disclosure.

At step 405, the hyper-converged management service 130 can generate and transmit a key validation request to the agent 341 that is running on the server 115 on which the VM 239 is also running. The agent 341 can be a network-accessible service running on the server 115 with which a trust relationship has already been established by the hyper-converged management service 130. For example, the agent 341 can represent a service that locally manages or instantiates the VMs 239 executing on the server 115. The agent 341 can also communicate with the VMs 239 executing on the server 115 using APIs that do not require the agent 341 to communicate with the VM 239 using the IP address that the hyper-converged management service 130 used to communicate with the VM 239. For example, an inter-process communication protocol can be used to communicate between the agent 341 and the VM 239. The Hyper-converged management service 130 can provide a copy of the public SSH host key 403 or an artifact of the key, such as a signature or hash of the key, to the agent 341.

The agent 341 can assess the validity of the public SSH host key and provide a validity indication to the hyper-converged management service 130 at step 407. The validity of the public SSH host key can be verified by the agent 341 by communicating with the VM 239 using a mechanism other than the IP address used by the hyper-converged management service 130 to communicate with the VM 239. The agent 341 can request the public SSH host key or an artifact of the key directly from the VM 239 and make a comparison with the public SSH host key or artifact received in the key validation request from the hyper-converged management service 130. If the key provided by the hyper-converged management service 130 is valid, or if it matches the key or artifact obtained directly from the VM 239, the agent can provide a validity indication that indicates that the key is valid. If the key does not match the key or artifact obtained directly from the VM 239, the validity indication can indicate that the key is invalid.

At step 409, the hyper-converged management service 130 can validate the public SSH host key received from the VM 239 based upon the validity indication. In one example, the hyper-converged management service 130 can determine whether the validity indication indicates that the key is valid. The Hyper-converged management service 130 can also save the public SSH host key in a host file associated with the hyper-converged management service 130 or a SSH implementation used by the hyper-converged management service 130.

At step 411, the hyper-converged management service 130 can continue setting up the SSH connection with the VM 239 because the public SSH key provided at step 401 has been validated by the agent 341. In one example, setting up the SSH connection can involve setting up the transport layer upon which the SSH connection is based so that communication between the two devices is encrypted using the public SSH keys that were exchanged between the VM 239 and the hyper-converged management service 130.

Figure 5:
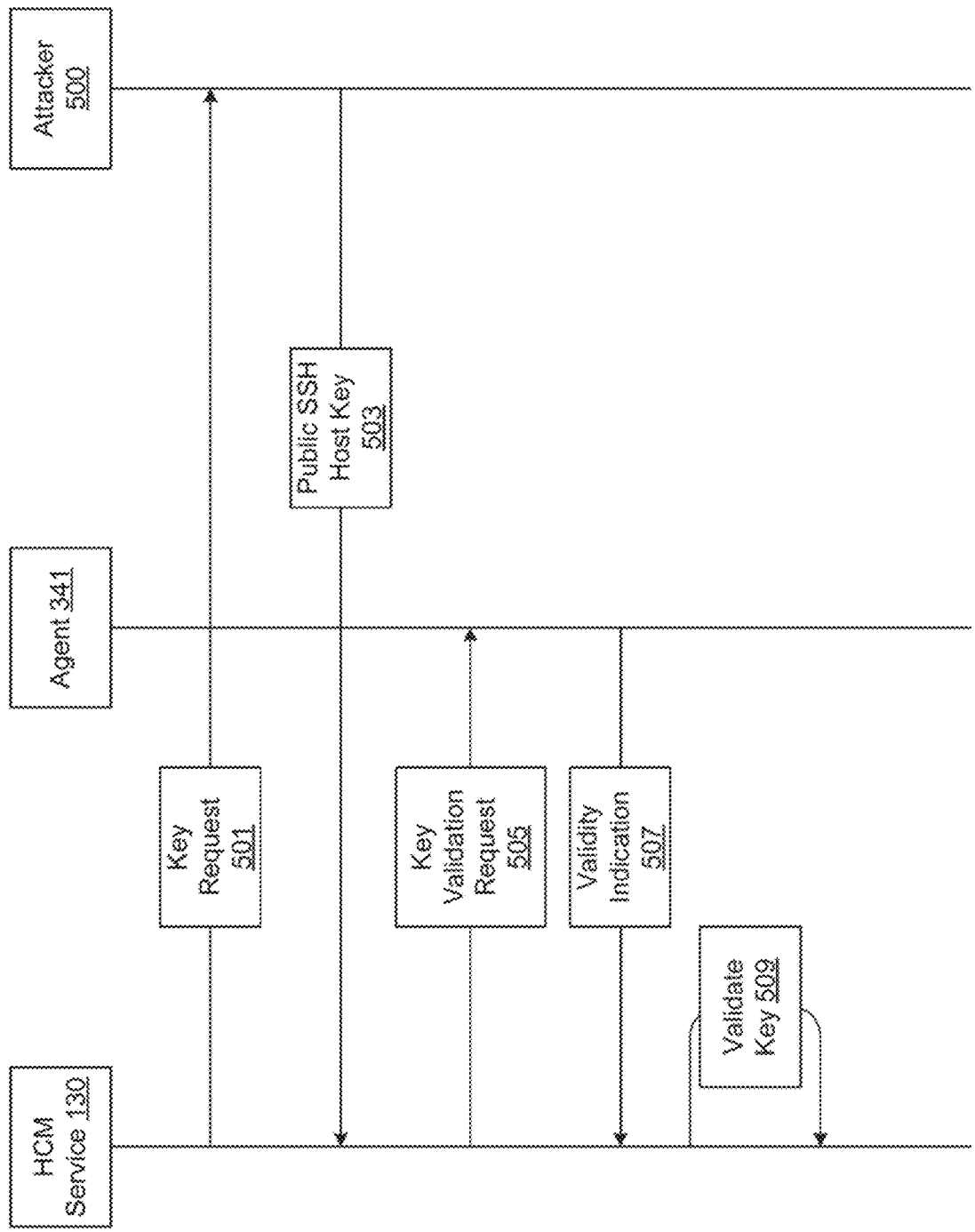
FIG. 5 is a sequence diagram showing interactions between components according to one example of the disclosure.

Referring next to FIG. 5, shown is a sequence diagram that illustrates how the hyper-converged management service 130 can attempt to validate a public SSH host key obtained from an attacker 500 that is attempting a man-in-the-middle attack designed to get the hyper-converged management service 130 to accept a forged or invalid public SSH host key. First, at step 501, the hyper-converged management service 130 can transmit a key request to a VM 239 addressable at a particular IP address. The key request 501 can represent a phase of the SSH key exchange or initialization process that is performed by SSH implementations or daemons running on the VM 239 and a machine that is executing the hyper-converged management service 130.

In the depicted scenario of FIG. 5, the intercepts or spoofs the IP address and responds to the key request with a public SSH host key 503. The public SSH host key is not the key of the intended VM 239 but is instead a forged or fake key that the attacker 500 is attempting to get the hyper-converged management service 130 to accept as the authoritative public SSH host key of the intended VM 239.

At step 505, the hyper-converged management service 130 can generate and transmit a key validation request to the agent 341 that is running on the server 115 on which the VM 239 is also running. The agent 341 can be a network-accessible service running on the server 115 with which a trust relationship has already been established by the hyper-converged management service 130. For example, the agent 341 can represent a service that locally manages or instantiates the VMs 239 executing on the server 115. The agent 341 can also communicate with the VMs 239 executing on the server 115 using APIs that do not require the agent 341 to communicate with the intended VM 239 using the IP address that the hyper-converged management service 130 used to communicate with the intended VM 239. For example, an inter-process communication protocol can be used to communicate between the agent 341 and the intended VM 239. The Hyper-converged management service 130 can provide a copy of the public SSH host key 403 or an artifact of the key, such as a signature or hash of the key, to the agent 341.

The agent 341 can assess the validity of the public SSH host key and provide a validity indication to the hyper-converged management service 130 at step 507. The validity of the public SSH host key can be verified by the agent 341 by communicating with the intended VM 239 using a mechanism other than the IP address used by the hyper-converged management service 130, which was ostensibly intercepted or spoofed by the attacker 500. The agent 341 can request the public SSH host key or an artifact of the key directly from the intended VM 239 and make a comparison with the public SSH host key or artifact received in the key validation request from the hyper-converged management service 130. If the key provided by the hyper-converged management service 130 is valid, or if it matches the key or artifact obtained directly from the VM 239, the agent can provide a validity indication that indicates that the key is valid. If the key does not match the key or artifact obtained directly from the VM 239, the validity indication can indicate that the key is invalid.

At step 509, the hyper-converged management service 130 can validate the public SSH host key received from the VM 239 based upon the validity indication. In one example, the hyper-converged management service 130 can determine whether the validity indication indicates that the key is invalid because the agent 341 determined that the key or artifact received in the key validation request did not match the key or artifact that the agent 341 obtained directly from the VM 239.

In some implementations, the hyper-converged management service 130 generate an alert to an administrator that an invalid or forged key was provided by an attacker 500. In other implementations, the hyper-converged management service 130 can cease setting up the SSH connection until further action is taken by an administrator.

Figure 6:
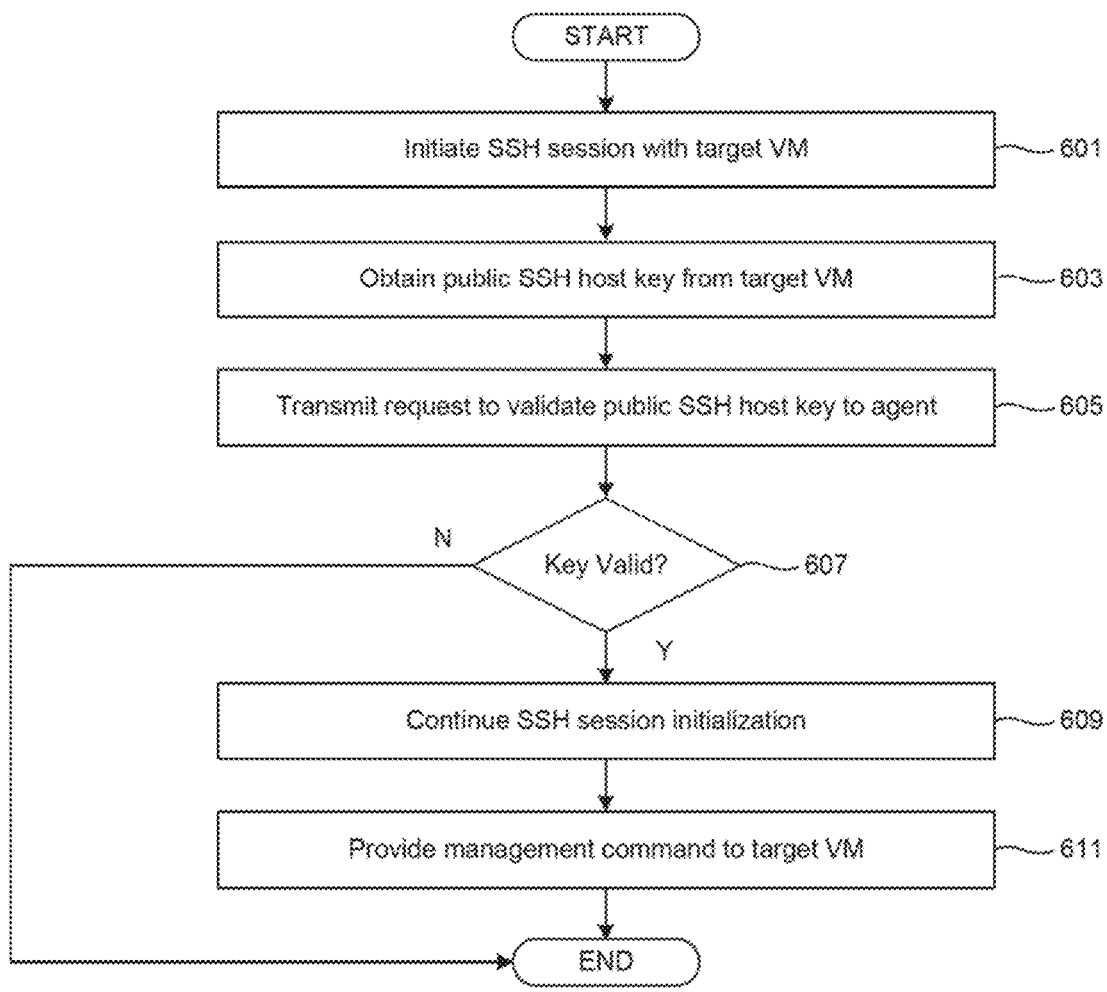
FIG. 6 is a flowchart illustrating functionality implemented by components of the networked environment.

Moving on to FIG. 6, shown is a flowchart that provides one example of the operation of a portion of the hyper-converged management service 130. The flowchart of FIG. 6 can be viewed as depicting an example of elements of a method implemented by the hyper-converged management service 130 executing in the computing environment 103 or in the hyper-converged computing environment 100 according to one or more examples. The separation or segmentation of functionality as discussed herein is presented for illustrative purposes only.

Beginning with step 601, the hyper-converged management service 130 can initiate a SSH session with a target VM 239. A target VM 239 can represent a VM 239 with which a communication session is needed in order to perform management tasks. The SSH session can be initiated by sending a request according to the SSH protocol to an IP address associated with the target VM 239.

At step 603, the hyper-converged management service 130 can obtain a public SSH host key from the target VM 239. The public SSH host key can be obtained as a part of the key exchange process that is specified by the SSH protocol. The public SSH host key can correspond to a private key maintained by the target VM 239 and can be used to secure or encrypt communications between the hyper-converged management service 130 and the target VM 239. The Hyper-converged management service 130 can also provide its public SSH host key to the target VM 239 so that the SSH transport layer can be established between the hyper-converged management service 130 and the VM 239.

At step 605, the hyper-converged management service 130 can transmit a request to validate the public SSH host key received from the VM 239 to the agent 341. The agent 341 can be executed on the same server 115 or computing device on which the VM 239 is executed. The request can include a copy of the public SSH key or an artifact of the public SSH key, such as a signature or hash that is based upon the public SSH key. The agent 341 can be a service that is running on the server 115 with which a trust relationship has been established with the hyper-converged management service 130.

At step 607, the hyper-converged management service 130 can determine whether the public SSH host key received at step 603 is valid based upon a validity indication received from the agent 341. If the hyper-converged management service 130 determines based on the validity indication that the public SSH host key is valid, the process proceeds to step 609. If the hyper-converged management service 130 determines that the public SSH host key is invalid, the process can proceed to completion. In some implementations the hyper-converged management service 130 can perform error handling logic, such as an administrator notification or logging. If the public SSH host key is invalid, the hyper-converged management service 130 can determine that an attacker has potentially provided a forged public SSH host key or that some other error has occurred that prevents the SSH session from being established.

At step 609, the hyper-converged management service 130 can continue establishing the SSH session with the target VM, as the validity indication from the agent 341 indicates that the public SSH host key is valid. In one example, the hyper-converged management service 130 can setup the SSH transport layer with the VM 239 and establish an encrypted communication session in which data can be exchanged.

At step 611, the hyper-converged management service 130 can provide a management command to the target VM 239. In one example, a management command can include a root credential, a user credential, a certificate, or other sensitive data that is needed to manage workload or execute applications within the VM 239. Thereafter, the process can proceed to completion.

The servers 115 or other devices comprising the computing environment 103 and the computing systems 106 can include at least one processor circuit, for example, having at least one hardware processor and at least one physical memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. Also stored in the memory can be a data store 124 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices can be used to access user interfaces generated to configure or otherwise interact with the hyper-converged management service 130. These client devices can include a display upon which a user interface generated by a client application can be rendered. In some examples, the user interface can be generated using user interface data provided by the computing environment 103. The client device can also include one or more input/output devices that can include, for example, a capacitive touchscreen or other type of touch input device, fingerprint reader, or keyboard.

Although the hyper-converged management service 130 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A computer-implemented method, comprising:
   initiating a secure shell (SSH) connection to a target virtual machine running on a host computing device, the host computing device being one of a plurality of hyper-converged computing devices in a hyper-converged virtual computing environment;
   obtaining a public SSH host key from the target virtual machine, wherein the public SSH host key corresponds to a private SSH host key associated with the target virtual machine;

sending an artifact of the public SSH host key to a trusted service running on the same host computing device as the target virtual machine, wherein the trusted service is configured to validate the public SSH host key associated with the target virtual machine by obtaining the public SSH host key directly from the target virtual machine in a request without using the same internet protocol address associated with the SSH connection to the target virtual machine;

obtaining a validity indication from the trusted service in response to a determination that the public SSH host key is valid or invalid; and saving the public SSH host key as a trusted key in response to the validity indication indicating that the public SSH host key is valid.

2. The computer-implemented method of claim 1, further comprising establishing a transport layer between the at least one computing device and the target virtual machine in response to the validity indication indicating that the public SSH host key is valid.

3. The computer-implemented method of claim 2, further comprising supplying at least one credential to the target virtual machine over the SSH connection subsequent to the transport layer being established.

4. The computer-implemented method of claim 1, wherein the artifact of the public SSH host key comprises a key signature or a copy of the public SSH host key.

5. The computer-implemented method of claim 1, wherein the trusted service validates the public SSH host key by communicating with the target virtual machine using an application programming interface (API) provided by a hypervisor running on the host computing device executing the target virtual machine.

6. The computer-implemented method of claim 5, wherein the API provided by the hypervisor validates the public SSH host key of the target virtual machine without communicating with the trusted service over a network connection.

7. A system, comprising:
at least one computing device comprising memory; and
program instructions stored in the memory and executable in the at least one computing device that, when executed, cause the at least one computing device to:
initiate a secure shell (SSH) connection to a target virtual machine running on a host computing device, the host computing device being one of a plurality of hyper-converged computing devices in a hyper-converged virtual computing environment;
obtain a public SSH host key from the target virtual machine, wherein the public SSH host key corresponds to a private SSH host key associated with the target virtual machine;
send an artifact of the public SSH host key to a trusted service running on the same host computing device as the target virtual machine, wherein the trusted service is configured to validate the public SSH host key associated with the target virtual machine by obtaining the public SSH host key directly from the target virtual machine in a request without using the same internet protocol address associated with the SSH connection to the target virtual machine;
obtain a validity indication from the trusted service in response to a determination that the public SSH host key is valid or invalid; and
save the public SSH host key as a trusted key in response to the validity indication indicating that the public SSH host key is valid.

8. The system of claim 7, wherein the program instructions further cause the at least one computing device to establish a transport layer between the at least one computing device and the target virtual machine in response to the validity indication indicating that the public SSH host key is valid.

9. The system of claim 8, wherein the program instructions further cause the at least one computing device supply at least one credential to the target virtual machine over the SSH connection subsequent to the transport layer being established.

10. The system of claim 7, wherein the artifact of the public SSH host key comprises a key signature or a copy of the public SSH host key.

11. The system of claim 7, wherein the trusted service validates the public SSH host key by communicating with the target virtual machine using an application programming interface (API) provided by a hypervisor running on the host computing device executing the target virtual machine.

12. The system of claim 11, wherein the API provided by the hypervisor validates the public SSH host key of the target virtual machine without communicating with the trusted service over a network connection.

13. The system of claim 7, wherein the program instructions further cause the at least one computing device to terminate the SSH connection prior to establishing a transport layer in response to the validity indication indicating that the public SSH host key is invalid.

14. A non-transitory computer-readable medium embodying program code executable in at least one computing device that, when executed by the at least one computing device, causes the at least one computing device to:
initiate a secure shell (SSH) connection to a target virtual machine running on a host computing device, the host computing device being one of a plurality of hyper-converged computing devices in a hyper-converged virtual computing environment;
obtain a public SSH host key from the target virtual machine, wherein the public SSH host key corresponds to a private SSH host key associated with the target virtual machine;
send an artifact of the public SSH host key to a trusted service running on the same host computing device as the target virtual machine, wherein the trusted service is configured to validate the public SSH host key associated with the target virtual machine by obtaining the public SSH host key directly from the target virtual machine in a request without using the same internet protocol address associated with the SSH connection to the target virtual machine;
obtain a validity indication from the trusted service in response to a determination that the public SSH host key is valid or invalid; and
save the public SSH host key as a trusted key in response to the validity indication indicating that the public SSH host key is valid.

15. The non-transitory computer-readable medium of claim 14, wherein the program code causes the at least one computing device to at least establish a transport layer between the at least one computing device and the target virtual machine in response to the validity indication indicating that the public SSH host key is valid.

16. The non-transitory computer-readable medium of claim 15, wherein the program code further causes the at least one computing device supply at least one credential to the target virtual machine over the SSH connection subsequent to the transport layer being established.

17. The non-transitory computer-readable medium of claim 14, wherein the artifact of the public SSH host key comprises a key signature or a copy of the public SSH host key.

18. The non-transitory computer-readable medium of claim 14, wherein the trusted service validates the public SSH host key by communicating with the target virtual machine using an application programming interface (API) provided by a hypervisor running on the host computing device executing the target virtual machine.

19. The non-transitory computer-readable medium of claim 18, wherein the API provided by the hypervisor validates the public SSH host key of the target virtual machine without communicating with the trusted service over a network connection.

20. The non-transitory computer-readable medium of claim 14, wherein the program code further causes the at least one computing device to terminate the SSH connection prior to establishing a transport layer in response to the validity indication indicating that the public SSH host key is invalid.

* * * * *